(12) United States Patent
Tam

(10) Patent No.: US 6,208,787 B1
(45) Date of Patent: Mar. 27, 2001

(54) MICROLENS AND LONG PERIOD GRATINGS

(75) Inventor: Hwayaw Tam, Shatin (HK)

(73) Assignee: The Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 09/304,966

(22) Filed: May 5, 1999

Related U.S. Application Data

(63) Continuation-in-part of application No. 09/285,036, filed on Apr. 1, 1999, now abandoned.

(51) Int. Cl.[7] .................................................. G02B 6/26
(52) U.S. Cl. ................................ 385/120; 385/34; 385/83
(58) Field of Search .................................. 385/115, 120, 385/119, 34, 83

(56) References Cited

U.S. PATENT DOCUMENTS

| | | | |
|---|---|---|---|
| 5,446,815 | * 8/1995 | Ota et al. | 385/33 |
| 5,980,119 | * 11/1999 | Furuyama | 385/89 |
| 5,991,492 | * 11/1999 | Ota et al. | 385/137 |
| 6,002,819 | * 12/1999 | Saito et al. | 385/22 |

* cited by examiner

*Primary Examiner*—Hung N. Ngo
(74) *Attorney, Agent, or Firm*—Leydig, Voit & Mayer, Ltd

(57) ABSTRACT

A microlens array includes short lengths of fibre held across an aperture in a rigid body. The fibres are conveniently short lengths cut from commercially available ultraviolet grade fused silica fibre that has had a normal outer protective coating removed. The microlens array is comparatively cheap to make and has particular application in producing long period gratings by exposing strands of silica fibre to UV radiation via the microlens array using a diffraction pattern produced by the microlens.

7 Claims, 1 Drawing Sheet

MICROLENS AND LONG PERIOD GRATINGS

This disclosure is a continuation-in-part of U.S. patent application Ser. No. 09/285,036, filed Apr. 1, 1999 now abandoned.

BACKGROUND OF THE INVENTION

1. Field of the Invention

The invention relates to fabrication of microlens arrays and its application to produce long period gratings.

2. Description of Prior Art

The invention relates more particularly to methods of producing a low cost microlens array with a length longer than 200 mm. Chosen forms of those microlens arrays are, according to this invention, used to write long period gratings with germanosilicate fibres, which fibres are themselves readily commercially available. Hitherto such long period gratings have been normally produced by using amplitude masks that must selectively blocks off laser radiation leading to inefficient use of power. Commercial micro-optics arrays constructed with UV grade fused silica is an alternative as it focuses the laser beam into a periodic pattern and thus requires much less energy from the laser. Unfortunately, the extremely high cost of such microlens arrays normally prohibits their use in long period grating fabrication.

SUMMARY OF THE INVENTION

It is an object of the invention to provide a method of producing low cost microlens arrays and/or overcoming or at least reducing the disadvantages referred to above.

According to one aspect of the invention there is provided a method of making a microlens array comprising preparing a plurality of short lengths of transparent fibre, holding the fibres side by side and fixing their ends to a rigid body having an open region across which the fibres extend and through which radiation may pass.

The method may include the step of gluing the ends of the fibres to fix them to a planar surface of the rigid body.

The gluing is preferably carried out using epoxy resin.

The fibres may be prepared by taking commercially available UVGFS fibre, removing its outer protective coating and cutting off short lengths.

The method may include polishing one side of the microlens array so that each fibre has a generally semicircular cross-section.

According to another aspect of the invention there is provided a microlens array formed of a plurality of transparent fibres that are held together side by side and extend across an opening in a rigid body.

The fibres are preferably prepared by removing an outer protective coating of commercially available UVGFS fibre from a length of fibre, and cutting that fibre into short lengths.

According to a further aspect of the invention there is provided a method of making a long period grating which comprises placing a strand of silica fibre across and below a microlens array described above, and radiating the strand via the lens with UV radiation.

BRIEF DESCRIPTION OF THE DRAWING

Methods of making microlens arrays and producing long period gratings according to the invention will now be described by way of example with reference to the accompanying drawings in which.

DESCRIPTION OF THE PREFERRED EMBODIMENTS

Figure 1:
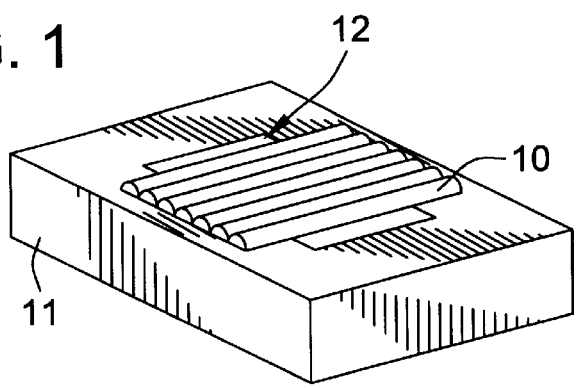
FIG. 1 is a top isometric view of a microlens array arrangement.
Figure 2:
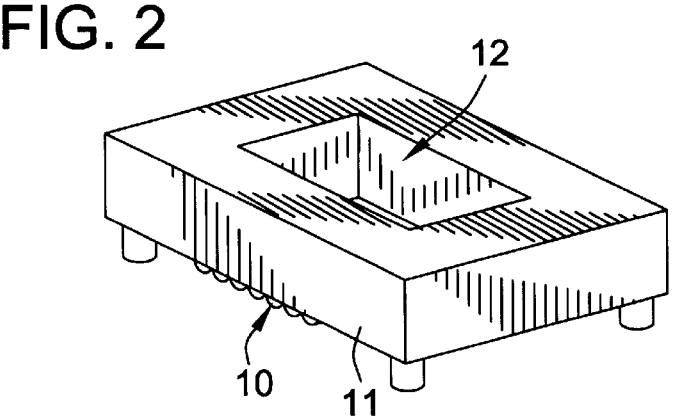
FIG. 2 is a bottom isometric view of the microlens array arrangement of FIG. 1.

Referring to the drawings, in FIGS. 1 and 2 the microlens array is formed by a number of short lengths of UV grade fused silica fibres 10 held together side by side by epoxy resin against one side of a planar aluminum block 11. The block is hollow, having a central aperture 12 as seen more clearly in FIG. 2, to allow UV radiation to pass through the short lengths of fibres that together form the microlens array.

In this embodiment, for the fibres 10 commercially available Ultra Violet Grade Fused Silica (UVGFS) fibre with low attenuation from 180 to 1100 nm was used. The cladding diameter of the fibre is 440 $\mu$m and the fibre is normally provided with a polyimide buffer that is removed using a butane flame. After removal of this outer coating, the fibre is cut into lengths approximately 2 cm. long and epoxied to the surface of the block 11. The block dimensions are 5×2×1 cm. and the central aperture 12 is 4×1 cm. The period of the microlens array is 440 $\mu$m, defined by the cladding diameter.

Figure 3:
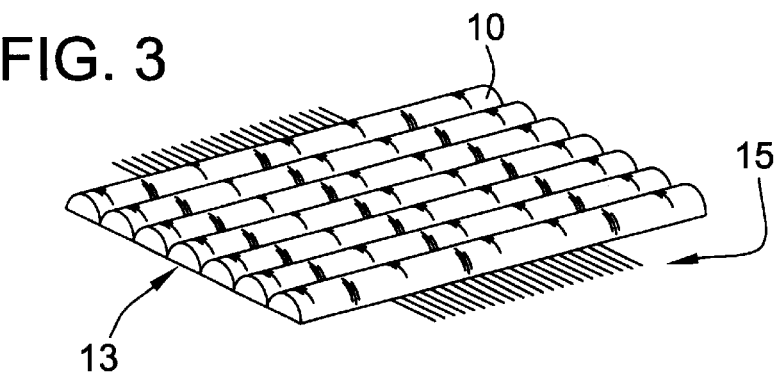
FIG. 3 shows part of the microlens array in closer detail.
Figure 4:
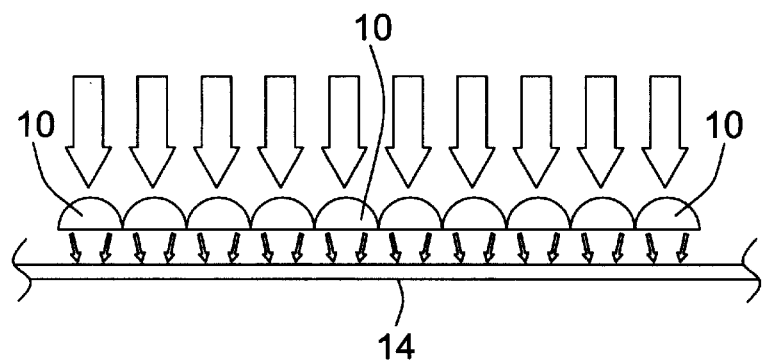
FIG. 4 is a view from one side of a set-up for producing a long period grating using the microlens array of FIGS. 1 to 3.

The microlens array arrangement as shown in FIG. 3 has been polished on one underside 13 so that each fibre 10 has a generally semi-circular cross-section. This microlens array is used to produce a long period grating in the set up shown in FIG. 4. Ultra violet light having a wavelength of 193 or 248 $\mu$m, for example, is directed from above the microlens array arrangement to radiate (or "write onto") a silica fibre strand 14 that is held across and below the microlens fibres 10. Before the writing process, the fibre 14 is photosensitized by soaking the fibre in hydrogen under pressure for several days. An Ar.F or Kr.F laser was used to irradiate the fibre. The power density of the laser beam was about 150 mJ/cm$^2$/pulse and the laser was operated at a repetition frequency of 50 Hz and the beam dimensions were 26 mm by 11 mm. It will be understood that a longer length of long period grating can be fabricated by either expanding the beam dimensions or moving the beam along the microlens array.

Many silica fibre strands 15 can be held across and below the microlens array. This permits simultaneous fabrication of many long period gratings.

The described set-up enables mass production of long period gratings, which have many applications in the laboratory and in industry, to be produced at a fraction of the cost of otherwise available techniques. Also, with the provision of the microlens array, the grating configuration is produced by diffraction and not, as in earlier arrangements, by selectively blocking off strips of UV radiation. Thus, the long period gratings made according to this invention use less laser power for their formulation.

It will be appreciated that whereas the described microlens array is made up of UVGFS fibres, a microlens array for various uses can be made using other transparent material, that is to say transparent in the sense of being transparent to any particular radiation of interest.

I claim:

1. A method of making a microlens array comprising preparing a plurality of transparent ultraviolet grade fused silica (UVGFS) fibres by removing an outer protective coating from the silica fibres, cutting lengths of the UVGFS fibres, holding the lengths of the fibres side by side, and fixing ends of the fibres to a rigid body having an open region across which the fibres extend and through which radiation may pass.

2. The method according to claim 1, including gluing the ends of the fibres to fix them to a planar surface of the rigid body.

3. The method according to claim 2, including gluing the ends using epoxy resin.

4. A method of making a microlens array including preparing a plurality of transparent fibres, holding the fibres side by side, fixing ends of the fibres to a rigid body having an open region across which the fibres extend and through which radiation may pass, and polishing one side of the microlens array so that each fibre has a partially circular cross-section.

5. A microlens array including a rigid body having an opening and a plurality of transparent fibres held together side by side and extending across the opening wherein the fibres are prepared by removing an outer protective coating from ultraviolet grade fused silica (USGFS) fibres, and cutting the fibers into lengths.

6. A method of making a long period grating comprising placing a strand of silica fibre across and spaced from a microlens array including a rigid body having an opening and a plurality of transparent fibres held together side by side and extending across the opening, and irradiating the strand via the microlens array with ultraviolet radiation.

7. The method according to claim 6, including making a plurality of gratings at the same time using a single microlens array for irradiating a plurality of strands of silica fibre by laying the fibres side by side adjacent the microlens array.

* * * * *